United States Patent
Stoller

(10) Patent No.: US 12,282,136 B2
(45) Date of Patent: Apr. 22, 2025

(54) DOWNHOLE LITHIUM DETECTION SYSTEMS AND METHODS

(71) Applicant: Schlumberger Technology Corporation, Sugar Land, TX (US)

(72) Inventor: Christian Stoller, Neuenhof (CH)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/472,435

(22) Filed: Sep. 22, 2023

(65) Prior Publication Data
US 2025/0102699 A1    Mar. 27, 2025

(51) Int. Cl.
*G01N 23/222*      (2006.01)
*G01N 23/2208*    (2018.01)
(Continued)

(52) U.S. Cl.
CPC ......... *G01V 5/102* (2013.01); *G01N 23/2208* (2013.01); *G01N 23/222* (2013.01);
(Continued)

(58) Field of Classification Search
CPC ............... G01N 23/221; G01N 23/222; G01N 2223/07; G01N 2223/074; G01N 2223/0745; G01N 2223/106; G01N 2223/1063; G01N 2223/1066; G01N 2223/507; G01N 2223/616; G01V 5/04; G01V 5/10; G01V 5/102; G01V 5/104; G01V 5/105; G01V 5/107; G01V 5/108;
(Continued)

(56) References Cited

U.S. PATENT DOCUMENTS

| | | | |
|---|---|---|---|
| 2,843,752 A | | 7/1958 | Katayama et al. |
| 2,983,817 A | * | 5/1961 | Earley .................. G01N 23/222 |
| | | | 250/255 |

(Continued)

OTHER PUBLICATIONS

Ellis et al., Well Logging for Earth, Scientists, 2nd edition, Springer, 2007, Book: Chapter 15, p. 383-414.
(Continued)

*Primary Examiner* — Allen C. Ho
(74) *Attorney, Agent, or Firm* — Jeffrey D. Frantz

(57) ABSTRACT

A system may include one or more downhole tools, where a first downhole tool includes a pulsed neutron generator to emit neutrons into a borehole of a geological formation and one or more gamma-ray detectors to obtain a measurement of gamma-ray emissions, of a borehole environment, induced by the emitted neutrons. The system may also include data processing circuitry to determine a Sigma value associated with the borehole environment based on the measurement and determine elemental concentrations, excluding lithium, based on one or more gamma-ray energy spectra obtained via the one or more downhole tools. The data processing circuitry may also determine an elemental Sigma contribution of the elements other than lithium based on the elemental concentrations, determine a lithium Sigma contribution based on a difference between the Sigma value and the elemental Sigma contribution, and determine a lithium concentration within the borehole environment based on the lithium Sigma contribution.

21 Claims, 5 Drawing Sheets

(51) Int. Cl.
*G01V 5/04* (2006.01)
*G01V 5/10* (2006.01)
*G01V 5/22* (2024.01)

(52) U.S. Cl.
CPC .............. *G01V 5/045* (2013.01); *G01V 5/234* (2024.01); *G01N 2223/0745* (2013.01); *G01N 2223/1066* (2013.01); *G01N 2223/507* (2013.01); *G01N 2223/616* (2013.01)

(58) Field of Classification Search
CPC .......... G01V 5/22; G01V 5/222; G01V 5/234; G01V 5/101
USPC .................................................. 376/158–166
See application file for complete search history.

(56) References Cited

U.S. PATENT DOCUMENTS

| | | | |
|---|---|---|---|
| 3,379,884 A | 4/1968 | Youmans | |
| 3,461,291 A | 8/1969 | Goodman | |
| 4,390,783 A | 6/1983 | Grau | |
| 4,409,481 A * | 10/1983 | Smith, Jr. | G01V 5/102 250/262 |
| 4,721,853 A * | 1/1988 | Wraight | G01V 5/108 250/269.7 |
| 4,937,446 A | 6/1990 | McKeon et al. | |
| 5,045,693 A | 9/1991 | McKeon et al. | |
| 5,471,057 A | 11/1995 | Herron | |
| 5,786,595 A | 7/1998 | Herron et al. | |
| 6,781,115 B2 | 8/2004 | Stoller | |
| 8,513,947 B2 * | 8/2013 | Villegas | G01V 5/104 324/338 |
| 8,521,435 B2 * | 8/2013 | Minh | G01V 11/00 708/200 |
| 8,692,182 B2 * | 4/2014 | Nikitin | G01T 1/20 250/256 |
| 8,907,270 B2 * | 12/2014 | Beekman | G01V 5/101 250/269.6 |
| 9,086,500 B2 * | 7/2015 | Ansari | G01V 5/10 |
| 9,316,753 B2 * | 4/2016 | Slaughter | G01T 3/065 |
| 9,417,355 B2 * | 8/2016 | Stoller | G01V 5/101 |
| 9,477,006 B2 * | 10/2016 | Zhou | G01V 5/102 |
| 9,541,668 B2 * | 1/2017 | Grau | G01V 5/10 |
| 9,568,638 B2 * | 2/2017 | Fitzgerald | G01V 5/105 |
| 9,671,519 B2 * | 6/2017 | Tkabladze | G01V 5/105 |
| 9,798,037 B2 * | 10/2017 | Zhou | G01V 5/108 |
| 9,835,758 B2 * | 12/2017 | Zhou | G01V 5/045 |
| 9,869,791 B2 * | 1/2018 | Zhou | G01V 5/04 |
| 9,897,719 B2 * | 2/2018 | Stephenson | G01V 5/101 |
| 9,939,549 B2 * | 4/2018 | Miles | G01V 5/00 |
| 9,952,348 B2 | 4/2018 | Zhou et al. | |
| 10,001,582 B2 * | 6/2018 | Zhou | G01V 5/101 |
| 10,061,055 B2 * | 8/2018 | Grau | G01V 5/104 |
| 10,209,393 B2 * | 2/2019 | Quirein | G01V 5/102 |
| 10,247,849 B2 | 4/2019 | Pfutzner et al. | |
| 10,261,214 B2 * | 4/2019 | Stoller | G01V 5/104 |
| 10,429,540 B2 | 10/2019 | Grau | |
| 10,466,384 B2 * | 11/2019 | McKeon | G01V 5/101 |
| 10,520,641 B2 * | 12/2019 | Inanc | G01V 5/105 |
| 10,564,311 B2 * | 2/2020 | Stoller | G01V 5/101 |
| 10,725,201 B2 * | 7/2020 | Mendez | G01N 33/24 |
| 11,073,635 B2 * | 7/2021 | Zhou | G01V 5/104 |
| 11,079,513 B2 * | 8/2021 | Banzarov | G01V 5/102 |
| 11,243,328 B2 * | 2/2022 | Pemper | G01V 5/101 |
| 11,346,833 B2 * | 5/2022 | Villar De Andrade E Silva | G01V 5/04 |
| 11,402,537 B2 * | 8/2022 | Han | G01V 5/102 |
| 11,474,277 B2 * | 10/2022 | Zhan | G01V 5/102 |
| 11,480,046 B2 * | 10/2022 | Krueger | G01V 5/104 |
| 11,555,941 B1 * | 1/2023 | Schmid | G01V 5/102 |
| 11,624,855 B2 * | 4/2023 | Mamtimin | G01V 5/101 250/269.5 |
| 11,635,543 B2 * | 4/2023 | Mamtimin | G01V 5/102 702/8 |
| 11,681,069 B1 * | 6/2023 | Mamtimin | G01V 5/102 250/269.4 |
| 11,693,147 B2 * | 7/2023 | Whetton | G01V 5/104 250/269.1 |
| 11,703,611 B2 * | 7/2023 | Zhan | G01V 5/105 702/2 |
| 11,733,421 B2 * | 8/2023 | Zhan | G01V 5/105 250/256 |
| 11,906,690 B2 * | 2/2024 | Inanc | G01V 5/045 |
| 2011/0303313 A1 | 12/2011 | Hopkins | |

OTHER PUBLICATIONS

Serra, Fundamentals of Well Log Interpretation, Elsevier, 1984, book : Chapter 9 and 10, p. 151-193.

Radtke et al., A New Capture and Inelastic Spectroscopy Tool Takes Geochemical Logging to the Next Level, Publication: LithoScanner, Paper AAA, SPWLA 53rd Annual, Logging Symposium, Jun. 16-20, 2012, 16 Pages.

Pemper et al., (WFT), A New Geochemical Logging, Tool for Determination of Formation Chemistry and Mineralogy in both Conventional and Unconventional Reservoirs, SPE-191411-MS, 2018 ATCE, Dallas, TX Sep. 24-26, 2018, 18 Pages.

* cited by examiner

DOWNHOLE LITHIUM DETECTION SYSTEMS AND METHODS

BACKGROUND

This disclosure relates to using downhole measurement techniques to determine the relative concentrations and/or weight fractions of various elements within a geological formation. In particular, the present disclosure relates to using neutron-induced gamma-ray spectroscopy in combination with other techniques to determine the presence and/or concentration of lithium in a geological formation.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

The use of lithium in different areas of technology, such as batteries for electronic devices, battery electric vehicles, etc., has increased demand for lithium significantly over time. As such, the search for new sources of lithium has also increased. However, it may be difficult and/or resource intensive to find deposits of lithium in quantities/concentrations that are viable for extraction. As such, it may be desirable to devise a method for estimating the presence and/or concentration of lithium in a geological formation.

Some fields of technology use techniques for determining certain properties of geological formations. For example, hydrocarbon exploration and production may be informed by measurements from downhole well-logging tools that are conveyed deep into the borehole. The measurements may be used to infer properties and characteristics of the geological formation surrounding the borehole. The discovery and observation of resources using downhole techniques generally takes place down in the borehole with sensors. These sensors may be a part of a tool-string that may be attached to a drill or other downhole device.

For example, measurements may be done using neutron-induced gamma-ray spectroscopy. Such measurements may be used to estimate the abundance of oil or other resources of interest in the area. In general, high-energy neutrons may be emitted into the environment (e.g., the borehole and/or the geological formation). The high-energy neutrons may collide with, be captured by, and/or scatter off the nuclei of elements in the environment. Some of these interactions may cause the nuclei to emit gamma rays having energies that vary depending on the type of element that emitted the gamma ray. By analyzing the energy spectrum of gamma rays, relative yields (e.g., fractions of the total gamma-ray spectrum) of the different elements found in and around the borehole may be determined, which may then be used to determine properties of the geological formation.

However, while lithium has a relatively high neutron absorption cross-section, the principal reaction does not lead to a gamma-ray emission, and, thus, there is no readily distinguishable gamma-ray signature. As such, a method to recognize and estimate the presence of lithium is desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Indeed, in one example, a system may include one or more downhole tools, where a first downhole tool includes a pulsed neutron generator to emit neutrons into a borehole of a geological formation and one or more gamma-ray detectors to obtain a measurement of gamma-ray emissions of a borehole environment induced by the emitted neutrons. The system may also include data processing circuitry to determine a Sigma value associated with the borehole environment based on the measurement and determine elemental concentrations, excluding lithium, based on one or more gamma-ray energy spectra obtained via the one or more downhole tools. The data processing circuitry may also determine an elemental Sigma contribution of the elements other than lithium based on the elemental concentrations, determine a lithium Sigma contribution based on a difference between the determined Sigma value and the elemental Sigma contribution, and determine a lithium concentration within the borehole environment based on the lithium Sigma contribution.

In another embodiment, a method may include determining a Sigma value associated with a borehole environment based on a first measurement of the borehole environment that includes counts of neutron-induced gamma-ray emissions, determining elemental concentrations of elements, excluding lithium, based on one or more gamma-ray energy spectra of a second measurement of the borehole environment that includes energy levels of neutron-induced gamma-ray emissions, and determining an elemental Sigma contribution of the elements based on the plurality of elemental concentrations. The operations may also include determining a lithium Sigma contribution based on a difference between the Sigma value and the elemental Sigma contributions, and determining a lithium concentration within the borehole, the geological formation, or both based on the lithium Sigma contribution.

In another embodiment, a non-transitory, machine-readable media may store instructions that, when executed by processing circuitry, cause the processing circuitry to perform operations. The operations may include determining a Sigma value associated with a borehole environment based on gamma-ray counts measured at the borehole environment, determining elemental concentrations of elements, excluding lithium, based on one or more gamma-ray energy spectra measured at the borehole environment, and determining an elemental Sigma contribution of the elements based on the plurality of elemental concentrations. The operations may also include determining a lithium Sigma contribution based on a difference between the measured Sigma value and the elemental Sigma contribution, and determining a lithium concentration of the borehole environment based on the lithium Sigma contribution.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
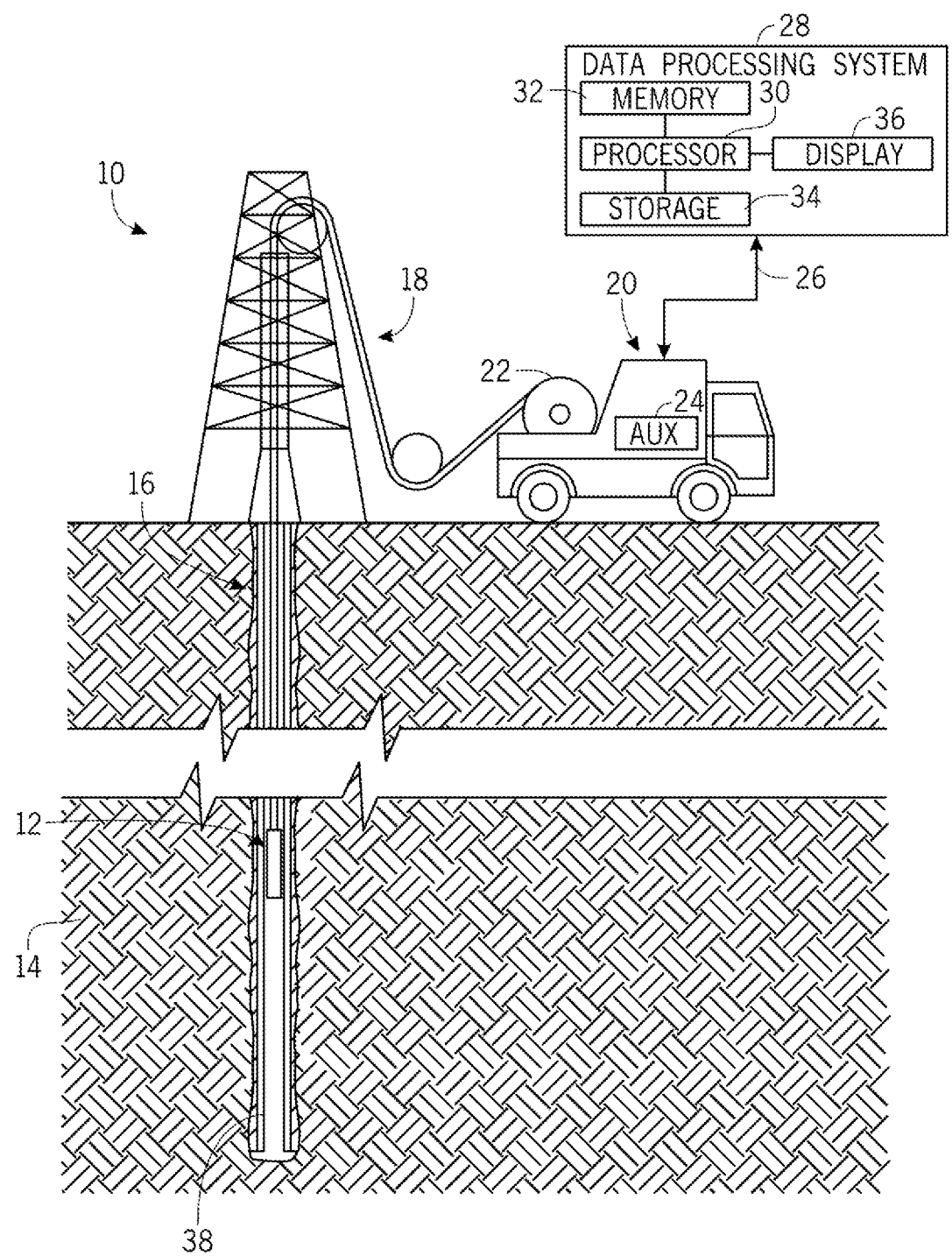
FIG. 1 is an example of a neutron-induced downhole gamma-ray spectroscopy system, in accordance with an embodiment.

One or more specific embodiments of the present disclosure will be described below. These described embodiments are examples of the presently disclosed techniques. Additionally, in an effort to provide a concise description of these embodiments, the features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The oil and gas industry includes a number of sub-industries, such as exploration, drilling, logging, extraction, transportation, refinement, retail, and so forth. During exploration and drilling, boreholes may be drilled into the ground for reasons that may include discovery, observation, or extraction of resources. These resources may include oil, gas, water, or any other combination of elements within the ground.

Boreholes, sometimes called wellbores, may be straight or curved holes drilled into the ground from which resources may be discovered, observed, or extracted. During and/or after the establishment of a borehole, well logging may be practiced. Well logging may include making a detailed record of the geological formations penetrated by a borehole, and is generally part of the discovery and observation of resources.

The exploration of what lies beneath the ground may be accomplished by a number of methods including surface and downhole techniques. The discovery and observation of resources using downhole techniques generally takes place down in the borehole with sensors. These sensors may be a part of a tool-string that may be attached to a drill or other downhole device.

One particular type of measurement involves neutron-induced gamma-ray spectroscopy. The measurement may be used to estimate the abundance of oil or other resources of interest in the area. In general, high-energy neutrons may be emitted into the environment (e.g., the borehole and/or the geological formation). The high-energy neutrons may collide with, be captured by, and/or scatter off the nuclei of elements in the environment. These interactions may cause the elements to emit gamma rays having energies that vary depending on the type of element that emitted the gamma ray and on the type of interaction of the neutron with the element. By analyzing energy spectra of gamma rays, relative yields of the different elements found in and around the borehole may be determined, which may be translated into elemental concentrations or weight fractions, and used to determine properties of the geological formation and/or the borehole surrounding the downhole tool. When collecting gamma-ray spectra, relative yields may be calculated from gamma rays induced from neutron capture events—also known as thermal neutron capture events—and/or inelastic scattering or high energy nuclear reaction events. As used herein, gamma rays generated from neutron capture events may be referred to as "capture gamma rays" and gamma rays generated from inelastic scattering events and high energy nuclear reactions may be referred to as "inelastic gamma rays".

In general, hydrocarbons make up the majority of compounds of interest in downhole operations, being the base compounds of oil and gas. Nuclear measurements are used to obtain detailed information on the presence and abundance of hydrocarbons. This may include measuring elements such as carbon and oxygen directly, and/or obtaining a detailed understanding of the composition of the geological (e.g., rock) formation, such as the amount of pore space or other properties. As presently recognized, such measurements may not only be suited for the determination of hydrocarbons, but may also allow for further understanding of the properties of the formation rock and/or the fluid in the pore space thereof.

The increased demand for lithium, such as for energy storage technologies, has led to an increased demand for new sources of lithium. As such, in some scenarios, it may be desirable to utilize boreholes as access points for measuring the presence of and/or concentration of lithium in different geological formations. One form (isotope) of lithium (i.e., $^6Li$) has a relatively high thermal neutron absorption cross-section, also known as Sigma (e.g., the macroscopic thermal neutron capture cross section). However, measurements taken within the borehole, such as via neutron-induced gamma-ray spectroscopy may not directly measure lithium, as the neutron interaction with lithium, with the $^6Li$ isotope or the more abundant $^7Li$ isotope, does not have a useful gamma-ray signature. As such, a multi-step approach may be used to determine the presence of and/or concentration of lithium based on the neutron-induced gamma-ray measurements and the measure of the Sigma of the borehole environment (e.g., borehole, geological formation, or both). As should be appreciated, while discussed herein in the context of boreholes, the present techniques may be utilized in any suitable environment to detect the presence and/or concentration of lithium.

In some embodiments, neutrons may be introduced into the geological formation, such as via a neutron generator, and neutron-induced gamma-ray spectra may be measured along with the overall Sigma of the borehole environment (e.g., the Sigma of the borehole (borehole Sigma) and/or the Sigma of the geological formation (formation Sigma)). While there may be no distinguishable gamma-ray signature for lithium, other elements may be measured via gamma-ray spectroscopy and/or other techniques. In some embodiments, the presence and concentrations of elements other than lithium may be estimated and their contributions to the respective Sigma (e.g., borehole Sigma and/or formation Sigma) estimated. The contributions to the Sigma of the borehole environment of elements other than lithium may be subtracted from the Sigma of the borehole environment, and, due at least in part to lithium's relatively (e.g., compared to other elements) high Sigma, the remaining portion of the Sigma of the borehole environment may be estimated to be from lithium. As such, the presence and concentration of lithium in a geological formation may be estimated based on the Sigma of the borehole environment with the estimated contributions to Sigma from elements other than lithium subtracted therefrom. However, as discussed further below, it may be difficult to estimate the contributions of elements other than lithium to the Sigma of the borehole or the geological formation for elements that have more difficult to detect gamma-ray signatures such as boron. For example, in some scenarios, it may be difficult to distinguish the gamma-ray signature of boron from other gamma rays with similar energies. As should be appreciated, as discussed herein, Sigma may define the macroscopic thermal neutron capture cross section of an element (e.g., as a property thereof) or of an environment (e.g., borehole environment) including a collection of different elements. Moreover, the Sigma of a borehole environment, as used herein, may be considered as a sum of Sigma contributions from the collection of elements (e.g., weighted by their respective concentrations) in a borehole (e.g., borehole Sigma) or a geological formation (e.g., formation Sigma) around the borehole.

With the foregoing in mind, FIG. 1 illustrates a well-logging system 10 that may employ the systems and methods of this disclosure. The well-logging system 10 may be used to convey a downhole tool 12 through a geological formation 14 via a borehole 16. In the example of FIG. 1, the downhole tool 12 is conveyed on a cable 18 via a logging winch system 20 (e.g., vehicle). Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Moreover, while the downhole tool 12 is described as a wireline downhole tool, it should be appreciated that any suitable conveyance may be used. For example, the downhole tool 12 may instead be conveyed as a logging-while-drilling (LWD) tool as part of a bottom-hole assembly (BHA) of a drill string, conveyed on a slickline or via coiled tubing, and so forth. For the purposes of this disclosure, the downhole tool 12 may be any suitable downhole tool that uses neutron-induced capture and/or inelastic gamma-ray spectroscopy within the borehole 16.

The downhole tool 12 may receive energy from an electrical energy device or an electrical energy storage device, such as the auxiliary power source 24 or another electrical energy source to power the tool. Additionally, in some embodiments the downhole tool 12 may include a power source within the downhole tool 12, such as a battery system or a capacitor to store sufficient electrical energy to activate the neutron emitter and record gamma-ray radiation. In another embodiment, the power source may be a generator powered by the mud flow in a drill string.

Control signals 26 may be transmitted from a data processing system 28 to the downhole tool 12, and data signals 26 related to the measurement results (e.g., gamma-ray counts, energy spectra, etc.) may be returned to the data processing system 28 from the downhole tool 12. The data processing system 28 may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be read-only memory (ROM), random-access memory (RAM), flash memory, an optical storage medium, or a hard disk drive, to name a few examples. A display 36, which may be any suitable electronic display, may display images generated by the processor 30. The data processing system 28 may be a local component of the logging winch system 20 (e.g., at the surface), a part of the downhole tool 12 or BHA, a remote device that analyzes data from one or more logging winch systems 20, a device located proximate to the drilling operation, or any combination thereof. In some embodiments, the data processing system 28 may be a mobile computing device (e.g., tablet, smart phone, or laptop), a server remote from the logging winch system 20, or a combination thereof.

Figure 2:
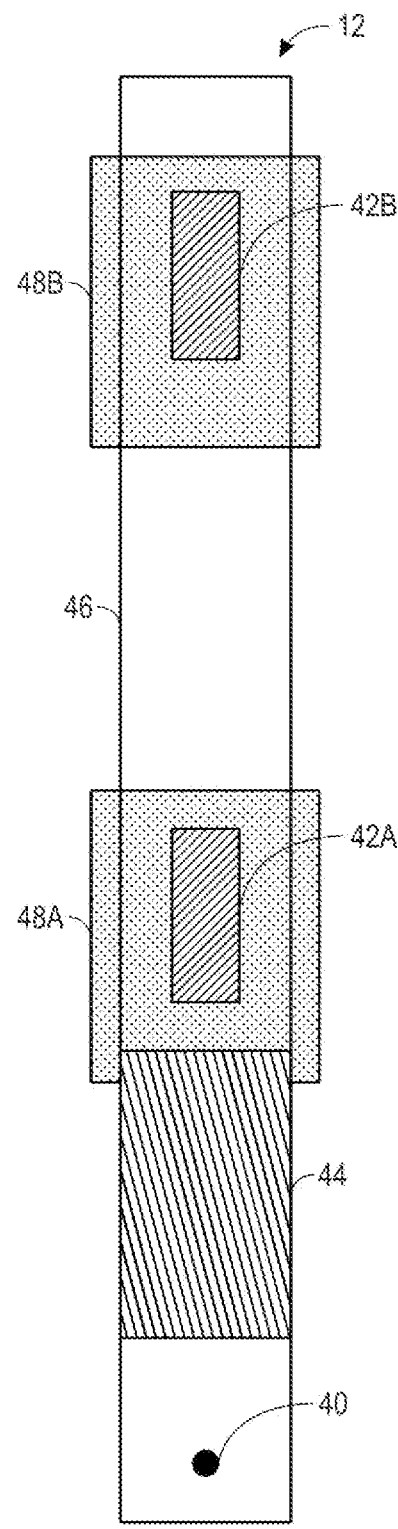
FIG. 2 is an example of a neutron-induced gamma-ray spectroscopy downhole tool, in accordance with an embodiment.

The downhole tool 12 may be used in a borehole 16 with or without a casing 38. As stated above, a borehole casing 38 may include pipe, cement, or other materials. Moreover, while depicted as a land-based well-logging system, in some embodiments, the techniques discussed herein may also be utilized in subsea and/or offshore applications. As depicted in FIG. 2, the downhole tool 12 may include a neutron source 40 and one or more gamma-ray detectors 42A, 42B. Additionally, the neutron source 40 and gamma-ray detectors 42A, 42B may be separated by a neutron/gamma-ray shield 44. The shield 44 may prevent neutrons and/or gamma rays from directly affecting the gamma-ray detectors 42A, 42B and/or minimize oversaturation. In some embodiments, a housing 46 around gamma-ray detectors 42A, 42B may be surrounded by thermal neutron shields, respectively 48A associated to gamma-ray detector 42A and 48B associated to gamma-ray detector 42B, which may prevent or reduce thermal neutrons from interacting with the downhole tool 12 (e.g., the housing 46 thereof or other components therein) near the detector(s) 42A, 42B and/or the detector(s) themselves. Additionally or alternatively, the detector(s) 42A, 42B may be surrounded, at least partially, by thermal neutron shields located inside the housing (not shown). In one embodiment, the neutron source 40, gamma-ray detectors 42A, 42B, and shield 44 are enclosed in a housing 46; however, the components may also be employed in separate housings 46. The neutron source 40 may be any suitable type of neutron generator (e.g., pulsed neutron generator (PNG))

that produces neutrons of sufficiently high energy to produce gamma rays via inelastic scattering and/or neutron capture events. When placed into the borehole 16 and activated, the neutron source 40 may emit high-energy neutrons into the surrounding geological formation 14 in multiple directions. These high-energy neutrons interact with nuclei in the surrounding area in events including, but not limited to, inelastic scattering and neutron capture.

Inelastic scattering events generally take place during the on time of the neutron emission from the neutron source 40, and may disappear quickly (e.g., within 2 microseconds (μs) or less) after the neutron emission has stopped. During an inelastic scattering collision, the neutron hits a nucleus causing the emission of one or more photons (e.g., gamma rays) of specific energy levels. This mono-energetic level (e.g., about 4.43 MeV for carbon) allows for the distinction of elements in the environment from each other and other background radiation in the spectrum of energies. Each gamma ray that is detected by one or more gamma-ray detectors 42 is counted in a bin with the associated energy level. The count rates of different energies may then be viewed as a spectrum of energies with associated counts for each energy level.

Unlike inelastic gamma rays, which are present primarily during the emission from the neutron source 40, capture gamma rays may be detected both during and after neutron emission, and the number of detections thereof may decrease after the neutron emission has stopped. The decay of the gamma-ray count rate may be approximated by a single or dual exponential or another function of time. The instantaneity of the inelastic gamma rays and the decay of capture gamma rays can be seen in plot 50 of FIG. 3 where the x-axis 52 depicts time in μs and the y-axis 54 depicts a normalized count rate of both types of detected gamma rays on a logarithmic scale. The difference between capture and inelastic gamma rays can be seen from the result of a PNG pulsing scheme 56. The pulsing scheme 56 may include multiple "on" periods 58 and "off" periods 60 (as shown in the detailed insert 61) of the neutron source 40 and an extended off period 68, which result in the gamma-ray detections of plot 50. For example, the on periods 58 may be 10 μs, the off periods 60 may be 25 μs, and an extended off period 68 may extend, for example, up to or at least 1 millisecond after the previous neutron on period 58. However, multiple different pulsing schemes 56 of on periods 58 and off periods 60, 68 may also be used.

Figure 3:
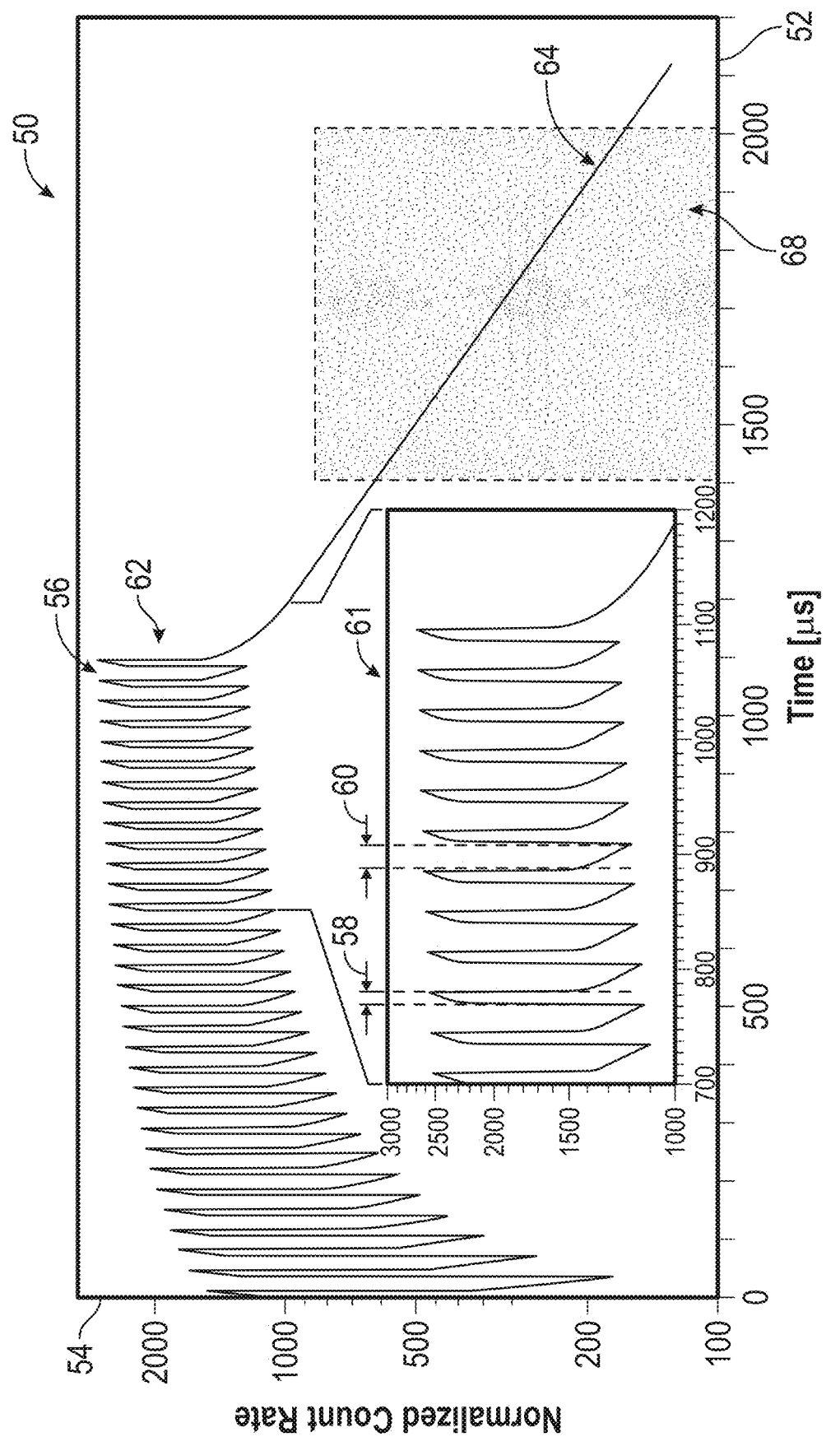
FIG. 3 is a plot of a neutron-induced gamma-ray measurement over time, in accordance with an embodiment.

In the illustrated embodiment shown in plot 50, when an on period 58 begins, the count rate may jump due to the instant increase in inelastic gamma-ray detection. Similarly, when the off period 60 begins, the count rate may immediately drop. Conversely, during the span of an on period 58, the count rate may continuously increase due to the increase in capture gamma rays. Likewise, during an off period 60, 68, the count rate may decrease as the thermal neutron population decreases due to neutron capture events and diffusion. Throughout the pulsing scheme 56, measurements pertaining to the energy levels of the gamma rays may also be taken to determine elemental relative yields of the environment. Inelastic spectra may be acquired during the on periods 58, and capture spectra may be acquired during the off period(s) 60 and/or the extended off period(s) 68. In some scenarios, spectra obtained during the extended off period 68 may be more representative of elements in the geological formation 14 (e.g., the rock of the geological formation 14), while spectra acquired during the off period 60 or part of it may contain more borehole information. In some embodiments, the pulsing scheme 56 may be repeated multiple times to gather more data. As should be appreciated, the time spectra shown in FIG. 3 are net time spectra, and constant background contributions from natural gamma rays and neutron activation have been subtracted.

After the final pulse 62 of the pulsing scheme 56, the extended off period 68 may begin. An exponential decay 64 relates to the die-away of the thermal neutrons through capture by isotopes in the environment and the concomitant die-away of the detected late capture gamma rays. The decay constant of the exponential decay 64 may be correlated (i.e., inversely proportional) to a Sigma value representative of properties of the borehole 16 and/or geological formation 14 (e.g., borehole Sigma and/or formation Sigma). Due to the elements within and the geometries and properties of the borehole 16 and the geological formation 14, the borehole 16 and geological formation 14 may have different Sigma values (borehole Sigma and formation Sigma). For example, the borehole 16 may include brine having a high concentration of chlorine and therefore a high capture cross section. In such a case, the decay may be represented by a dual-exponential, where the early decay (steeper slope) corresponds to borehole Sigma and the late, less steep, decay to the formation. In addition, the measured count rate may be affected by the diffusion of the thermal neutrons, as the size of the thermal neutron cloud increases with time. This leads to an additional count rate loss as gamma rays emitted at a larger distance are less likely to be detected, while neutrons may also migrate from the formation to the borehole and affect the apparent borehole Sigma. The borehole and formation Sigmas associated with the decay constants may therefore be considered apparent quantities that may be further corrected to account for their interaction and/or for neutron diffusion. Additionally, borehole Sigma and formation Sigma may be correlated to the decay 64 more or less at different time intervals during the decay 64. For example, earlier times during the decay 64 may have more borehole effect on the apparent Sigma than later times. It may be advantageous to use all or only part of the decay in the off period 60 to estimate borehole Sigma. It is also possible to determine an apparent borehole Sigma during all or part of the shorter decay interval of the off period 60 and an apparent formation Sigma during all or part of the longer decay interval of the extended off period 68. As such, the use of timing gates when taking measurements and determining the apparent Sigma may be done judiciously to better distinguish between borehole Sigma and formation Sigma and to correct for their interdependence. For example, the techniques discussed herein may be performed separately for each the borehole Sigma and formation Sigma as described in U.S. Pat. No. 4,721,853 or performed together e.g., by a dual-exponential fit as described in U.S. Pat. No. 4,409,481 or a more complex function, both of which are incorporated herein by reference. As should be appreciated, apparent Sigma values obtained by such approaches may be further corrected to obtain more accurate values. Borehole and formation Sigma may also be obtained by measuring the thermal neutron flux entering the downhole tool 12 with a separate thermal neutron detector such as a $^3$He-gas detector. Additionally or alternatively, a scintillation detector (e.g., gamma-ray detector 42) could be a detector detecting gamma rays and neutrons and allowing the separation of the signals belonging to neutrons or gamma rays. Furthermore, the use of time decay spectra from multiple detectors may lead to a more accurate determination of the borehole or formation Sigma as indicated in U.S. Pat. No. 8,521,435, which is incorporated herein by reference.

Furthermore, in some embodiments, the time-decay spectra may be acquired by a tool equipped with a neutron source 40 (e.g., pulsed neutron generator) and one or more gamma-ray detectors 42, and the neutron-induced gamma-ray spectra may be acquired by a separate downhole tool 12. Moreover, such measurements may be made in separate or concurrent logging runs in the borehole 16. For example, the separate downhole tool 12 may be equipped with a pulsed or continuous neutron source 40 such as an electronic neutron generator or chemical neutron source (e.g., $^{241}$AmBe or $^{252}$Cf). In some embodiments the spectral gamma-ray tool may have one or more gamma-ray detectors 42 that are optimized for the acquisition of boron gamma rays by using high-resolution gamma-ray detectors such as LaBr$_3$, LaCl$_3$ or CeBr$_3$ to name a few. Furthermore, in some embodiments, the gamma-ray detector(s) 42 may be high resolution semiconductor detectors such as CZT (Cadmium Zinc Telluride) or GaAs (Gallium Arsenide), or gas or liquid detectors such as liquid Xe-detectors.

Figure 4:
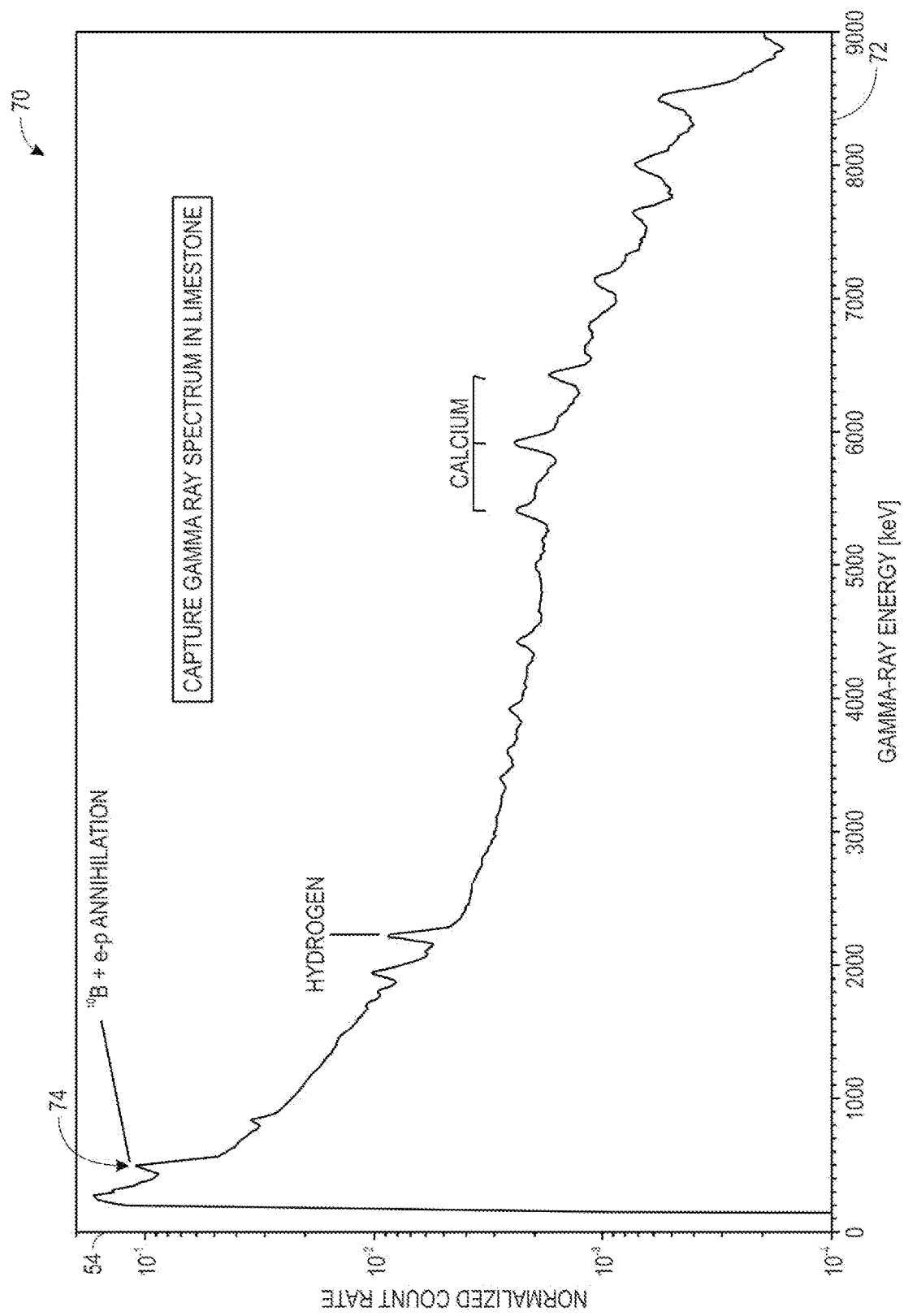
FIG. 4 is a gamma-ray energy spectrum from thermal neutron capture in a borehole in a limestone formation.

By utilizing the gamma-ray signatures from the capture gamma rays and/or inelastic gamma rays, a spectrum of gamma rays, with associated counts rates, may be determined that corresponds to the different elements in the borehole environment (e.g., within the borehole 16 and/or geological formation 14 therearound) and their relative concentrations. To help illustrate, FIG. 4 is an example capture spectrum 70 obtained from a gamma-ray spectroscopy measurement within a borehole 16 of a limestone formation with a high resolution LaBr$_3$ (Lanthanum Bromide) scintillation detector over a range of gamma-ray energies 72 from about 100 keV to 9000 keV. At low energy (e.g., about 500 keV), a peak 74 may be observed that includes gamma rays at 511-keV generated during electron-positron (e-p) annihilation and at 478-keV generated from the neutron capture reaction in $^{10}$B. Another prominent peak may be observed from neutron capture by a hydrogen nucleus at 2223 keV, and a prominent triplet of peaks may be observed that is caused by one of the more significant (e.g., in count rate) gamma rays emitted after the neutron capture in calcium (e.g., $^{40}$Ca). In some embodiments, the contributions to the low energy peak 74 around 500 keV can be untangled through spectral fitting procedures.

However, due to the lack of a discernable gamma-ray signature, lithium may not be directly measured in this fashion. Conversely, as lithium has an appreciable Sigma (e.g., thermal neutron absorption cross-section), lithium may be detected as part of the Sigma for the borehole environment. However, other elements, such as chlorine, hydrogen, boron, etc. may also have significant contributions to the borehole Sigma and/or formation Sigma, either due to their respective Sigmas (e.g., thermal neutron absorption and/or capture cross-section) and/or their relative concentration. For example, hydrogen may contribute a significant amount to the Sigma of the borehole environment due to the brine (e.g., water) in the borehole 16 and/or geological formation 14, and chlorine may contribute a significant amount to the Sigma of the borehole environment due to its high relative Sigma and its presence in the borehole 16 or formation fluid.

As such, in some embodiments, the amount of the borehole Sigma and/or formation Sigma contributed to by lithium may be obtained (e.g., estimated) by subtracting the Sigma contributions of other elements from the Sigma of the borehole environment (e.g., borehole Sigma and/or formation Sigma). Indeed, due to the relatively large thermal absorption cross-section of lithium, after subtracting the contributions due to the Sigma of the borehole environment by elements likely to have significant (e.g., measurable) contributions, such as but not limited to boron, chlorine, hydrogen, sodium, potassium, sulfur, calcium, iron, gadolinium etc., the remaining portion of the Sigma of the borehole environment may be assumed to be from lithium. In some embodiments, the elemental contributions to the Sigma of the borehole environment from the elements other than lithium may be determined from their elemental concentrations (e.g., determined via the gamma-ray measurements). For example, the known Sigma values (capture and/or absorption cross-sections) of the different elements may be used in a weighted sum (e.g., based on their elemental concentrations) to determine the contribution of the elements other than lithium to the Sigma of the borehole environment. As such, the remaining Sigma (e.g., difference from the Sigma of the borehole environment and sum of the contributions thereto from elements other than lithium) may be attributed to lithium and used to estimate the lithium concentration in the borehole 16 and/or geological formation, such as based on the known properties (e.g., Sigma) of lithium.

Based on the estimated amount (e.g., concentration) of lithium in the borehole environment, a decision may be made to perform an extraction of the lithium. For example, if the lithium concentration is greater than a threshold amount, the geological formation 14 may be determined as viable (e.g., profitable) for extraction of the lithium. Additionally or alternatively, the estimated concentration of lithium determined via the total Sigma may be used to instigate additional measurements to verify the lithium concentration. For example, more difficult and/or expensive measurements that would have otherwise not been done may be performed if the estimated amount of lithium is above a threshold and/or the resources of such measurements may be saved (e.g., measurements not performed) if the estimated lithium concentration is below a threshold. Additionally, in some embodiments, the neutron-induced gamma-ray measurements may be performed at multiple different vertical or axial (such as in deviated wells) depths within the geological formation 14 to obtain lithium concentrations at the different vertical depths. Furthermore, lithium concentrations at different radial distances from the borehole 16 and/or vertical depths may be made, at least in part, by detectors (e.g., gamma-ray detectors 42) at different spacings within the downhole tool 12, at different locations along a drill string, and/or by measurements taken at different times (e.g., corresponding to measurements further away from and closer to the downhole tool 12). As such, processing circuitry, such as the data processing system 28, may determine a depth map of lithium concentrations. Furthermore, in some embodiments, the depth map may be used to estimate the total amount of lithium in an area around the borehole 16 and/or in the borehole itself such as to warrant extraction or not.

As should be appreciated, additional information such as the neutron flux of the neutron source 40, borehole parameters (e.g., size, casing, brine solution, etc.), the position of the downhole tool 12 within the borehole 16, the porosity, formation density, and/or other parameters may be gathered and used in calculating the elemental concentrations of the elements other than lithium. Furthermore, additional types of measurements (e.g., chemical, nuclear, etc.) downhole and/or on the surface such as via fluid samples may also be taken to supplement or supplant the gamma-ray spectroscopy measurements. For example, information about the porosity, formation density, and/or tool location (e.g., relative position within the borehole 16) may make the estimated elemental concentrations from the gamma-ray spectroscopy more accurate. Additionally, in some embodiments, lithium concentrations may be measured from formation samples, borehole fluid samples, reservoir fluid (e.g., oil, water, etc.) samples, or other techniques. Such measurements may be used in conjunction with the estimated lithium concentration determined from the lithium contribution to the total Sigma to obtain a more accurate indication of the lithium concentration in the borehole environment and/or to increase a confidence level of the estimated lithium concentration. For example, if the lithium concentration in a rock or fluid sample is congruent (e.g., within a desired statistical deviation) with the estimated lithium concentration determined via the total Sigma, a confidence in the estimated lithium concentration in the borehole environment may be increased.

Furthermore, in some scenarios, different measurements may be needed to account for different types of elements. For example, in some scenarios, a neutron shield 44 around or inside the housing 46 of the downhole tool 12 may be composed of one or more elements, such as boron, that may interfere with the determination of elemental concentrations if performed based on a single measurement. As such, in some embodiments, one or more elemental concentrations, such as boron, may be obtained from a separate measurement and computed separately. This may be in addition to or in lieu of elemental concentration measurements provided by gamma-ray spectroscopy. As discussed above, the determination of boron from capture spectroscopy may be challenging due to the low energy (478-keV), the Doppler broadening of its gamma-ray energy 72, and/or the fact that its energy is close to other prominent gamma-ray energies 72, such as the 511-keV gamma ray from electron-positron annihilation and a low energy 517-keV gamma ray from neutron capture in chlorine.

Figure 5:
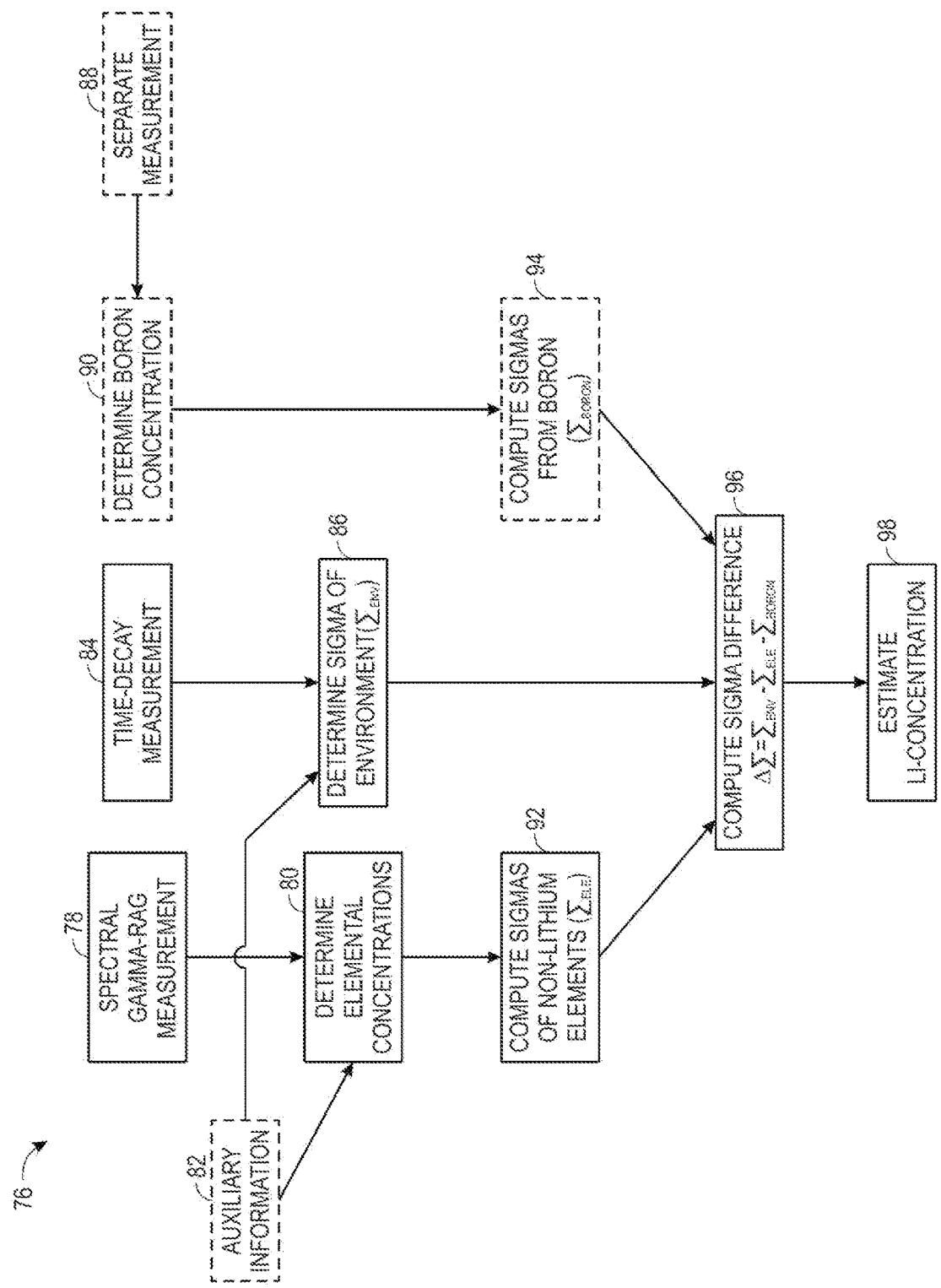
FIG. 5 is a flowchart of an example process for detecting the presence and/or concentration of lithium in a borehole or geological formation, in accordance with an embodiment.

FIG. 5 is a flowchart 76 of an example process for estimating a lithium concentration within a borehole 16. In some embodiments, a neutron induced spectral gamma-ray measurement may be made (process block 78), and elemental concentrations may be determined (process block 80). For example, elements other than lithium may emit capture gamma rays in response to capture of thermal neutrons generated by a neutron source 40 of a downhole tool 12, and the energy levels of the capture gamma rays may be measured. The elemental concentrations of the elements other than lithium may be estimated based on the energy signatures of the capture and/or inelastic gamma rays. As should be appreciated, auxiliary information 82, such as porosity, tool placement within the borehole 16, borehole characteristics, individual known element concentrations (e.g., by independent measurements), etc. may also be utilized to determine the elemental concentrations (process block 80).

Additionally, a time-decay measurement may be made (process block 84), and the Sigma(s) of the borehole environment may be determined (process block 86). For example, simultaneous or separate from the spectral gamma-ray measurement (process block 78), the time-decay measurement (process block 84) of neutron-induced gamma rays may be made, and the rate of decay may be used to estimate the borehole Sigma, formation Sigma, or both.

In some embodiments, a separate measurement (process block 88) may be used to determine the concentration of boron (process block 90). For example, in some embodiments, boron may be utilized in one or more neutron shields 44 of the downhole tool 12 used for the spectral gamma-ray measurement (process block 78) and/or time-decay measurement (process block 84). As such, interference due to capture gamma rays of the downhole tool 12 itself may weaken the accuracy of determination of the boron concentration. As such, a separate measurement (process block 88) utilizing a different downhole tool 12 or other method (e.g., fluid analysis, formation rock analysis, surface nuclear measurement, downhole nuclear measurement, etc.) may be used to determine the elemental concentration of boron in the borehole environment (process block 90). For example, the additional downhole tool 12 may be a second pulsed neutron tool optimized for the detection of boron. Alternatively, the downhole tool 12 may have an additional detector (e.g., gamma-ray detector 42) optimized for the detection of boron.

Additionally, the contribution to the total Sigma of the elements other than lithium may be computed from the elemental concentrations (process block 92). In some embodiments, one or more elements other than lithium (e.g., boron, chlorine, hydrogen, etc.) may be computed (process block 94) separately, such as from a separate measurement (process block 88) and concentration determination (process block 90). Furthermore, the difference between the total Sigma and the contributions to the total Sigma from non-lithium elements may be computed (process block 96), and the lithium concentration of the borehole 16 and/or geological formation 14 may be determined from the difference (process block 98).

As should be appreciated, in some embodiments, the processes discussed herein may be implemented via processing circuitry, such as the data processing system 28. For example, the techniques discussed herein may be computer implemented methods for determining the presence and/or concentration of lithium in a borehole environment. As should be appreciated, the processing circuitry may include any suitable computing device(s), and may deployed with the downhole tool 12, at the surface of the well-logging system 10, at a remote location, etc., and may be performed based on measurements (e.g., gamma-ray emission spectra) received directly from a downhole tool 12 and/or based on stored or historical measurement data.

Additionally, in some embodiments, the processing circuitry (e.g., data processing system 28) may include a machine learning component (e.g., algorithm). For example, the processing circuitry may include a machine learning/artificial intelligence (ML/AI) model that may predict or impute the lithium concentration within the borehole environment. For example, the ML/AI model may include a Generative Adversarial Network (GAN) model/framework (e.g., a Generative Adversarial Imputation Nets (GAIN) framework) that is adapted for gamma-ray spectra inputs. In some embodiments, the ML/AI model may be trained based on known (e.g., historical, experimental, or modeling) data, including but not limited to gamma-ray spectra (e.g., from downhole tools 12 in a borehole 16), spectral processing results (e.g., yields), time decay spectra (e.g., decay constants, apparent Sigmas), boron or other known elemental concentrations, formation density, formation porosity, neutron porosity, hydrogen index, and actual lithium concentrations in the corresponding borehole environments (e.g., as obtained via other measurements and/or experienced via extractions). Indeed, the ML/AI model may be trained on and/or use as input any suitable information gathered about a borehole 16 and/or geological formation 14.

In some embodiments, the ML/AI model may include a generative network (e.g., a generator) and a discriminative network (e.g., a discriminator). The generator may produce possible lithium concentrations. Meanwhile, the discriminator may be trained to classify (e.g., distinguish) lithium concentrations as 'real' if the lithium concentration is known (e.g., based on other measurements) or 'fake' if the lithium concentration is generated by the generator. As should be appreciated, 'real' in the context of the discriminator is taken to mean having a greater than a threshold confidence that the lithium concentration is accurate (e.g., the actual lithium concentration instead of a generated lithium concentration, via the generator). As should be appreciated, the GAIN ML/AI model is given as an example, and any suitable ML/AI model and/or computing program may be utilized to determine the lithium concentration according to the techniques discussed herein.

Technical effects of the present disclosure allow for the determination of a lithium concentration within a borehole 16 and/or geological formation 14 based on neutron-induced gamma-ray measurements, despite the fact that lithium does not have a distinguishable gamma-ray signature. Furthermore, a decision to perform additional measurements and/or an extraction of lithium from the geological formation 14 may be made based on the determined (e.g., estimated) lithium concentration. As should be appreciated, although the flowchart 76 is shown in a given order, in certain embodiments, portions of the flowchart may be reordered, deleted, occur simultaneously, and/or be initiated/controlled by multiple data processing systems 28.

The subject matter described in detail above may be exampled by, but not limited to, one or more embodiments, as set forth below, which may be used in any combination thereof.

EXAMPLE EMBODIMENT 1. A system comprising: one or more downhole tools, wherein a first downhole tool of the one or more downhole tools comprises: a pulsed neutron generator configured to emit neutrons into a borehole of a geological formation; one or more first gamma-ray detectors configured to obtain a first measurement of gamma-ray emissions of a borehole environment, the gamma-ray emissions induced by the neutrons emitted from the pulsed neutron generator; and data processing circuitry configured to: determine a Sigma value associated with the borehole environment based on the first measurement; determine a plurality of elemental concentrations of a corresponding plurality of elements based on one or more gamma-ray energy spectra obtained via the one or more downhole tools, wherein the plurality of elements excludes lithium; determine an elemental Sigma contribution of the plurality of elements based on the plurality of elemental concentrations; determine a lithium Sigma contribution based on a difference between the Sigma value and the elemental Sigma contribution; and determine a lithium concentration within the borehole environment based on the lithium Sigma contribution.

EXAMPLE EMBODIMENT 2. The system of example embodiment 1, wherein the plurality of elements excludes boron, and wherein determining the lithium Sigma contribution comprises subtracting the elemental Sigma contribution and a boron Sigma contribution from the Sigma value, wherein the boron Sigma contribution is based on an estimated boron concentration within the borehole environment.

EXAMPLE EMBODIMENT 3. The system of example embodiment 2, wherein the estimated boron concentration is based on a second measurement of a second downhole tool of the one or more downhole tools.

EXAMPLE EMBODIMENT 4. The system of example embodiment 3, wherein the second measurement comprises a borehole fluid analysis of the second downhole tool.

EXAMPLE EMBODIMENT 5. The system of example embodiment 2, wherein the estimated boron concentration is based on a second measurement of gamma-ray emissions of the borehole environment.

EXAMPLE EMBODIMENT 6. The system of example embodiment 5, wherein the second measurement of gamma-ray emissions is performed via the one or more first gamma-ray detectors of the first downhole tool or one or more second gamma-ray detectors of a second downhole tool of the one or more downhole tools.

EXAMPLE EMBODIMENT 7. The system of example embodiment 1, wherein the borehole environment comprises a portion of the geological formation surrounding the borehole, and wherein the Sigma value comprises a formation Sigma value.

EXAMPLE EMBODIMENT 8. The system of example embodiment 1, wherein the Sigma value is determined based on a decay rate of capture gamma rays of the gamma-ray emissions of the first measurement.

EXAMPLE EMBODIMENT 9. The system of example embodiment 1, wherein the one or more gamma-ray energy spectra is obtained via the one or more first gamma-ray detectors.

EXAMPLE EMBODIMENT 10. A method comprising: determining a Sigma value associated with a borehole environment based on a first measurement of the borehole environment, the first measurement comprising counts of neutron-induced gamma-ray emissions; determining a plurality of elemental concentrations of a corresponding plurality of elements based on one or more gamma-ray energy spectra of a second measurement of the borehole environment, the second measurement comprising energy levels of neutron-induced gamma-ray emissions, wherein the plurality of elements excludes lithium; determining an elemental Sigma contribution of the plurality of elements based on the plurality of elemental concentrations; determining a lithium Sigma contribution based on a difference between the Sigma value and the elemental Sigma contribution; and determining a lithium concentration within the borehole environment based on the lithium Sigma contribution.

EXAMPLE EMBODIMENT 11. The method of example embodiment 10, comprising: obtaining the first measurement and the second measurement via one or more gamma-ray detectors of a first downhole tool; or obtaining the first measurement via one or more gamma-ray detectors of the first downhole tool and obtaining the second measurement via one or more gamma-ray detectors of a second downhole tool.

EXAMPLE EMBODIMENT 12. The method of example embodiment 10, comprising: iteratively determining the Sigma value and the plurality of elemental concentrations for multiple vertical depths of the borehole environment based on respective measurements obtained at the multiple depths; determining the lithium concentration associated with each of the multiple depths; and determining a depth map comprising the lithium concentration associated with each of the multiple depths.

EXAMPLE EMBODIMENT 13. The method of example embodiment 10, wherein the plurality of elements excludes boron, the method comprising obtaining a boron Sigma contribution, and wherein determining the lithium Sigma contribution comprises subtracting the elemental Sigma contribution and the boron Sigma contribution from the Sigma value.

EXAMPLE EMBODIMENT 14. The method of example embodiment 13, wherein obtaining the boron Sigma contribution comprises determining the boron Sigma contribution based on an estimated boron concentration of the borehole environment.

EXAMPLE EMBODIMENT 15. The method of example embodiment 10, wherein the elemental Sigma contribution comprises a summation of individual contributions to the Sigma value by the plurality of elements.

EXAMPLE EMBODIMENT 16. The method of example embodiment 10, comprising determining whether to perform an extraction of lithium from the borehole environment based on the lithium concentration.

EXAMPLE EMBODIMENT 17. The method of example embodiment 16, wherein determining whether to perform the extraction comprises: determining a threshold concentration corresponding to a profitability of the extraction; and comparing the lithium concentration to the threshold concentration.

EXAMPLE EMBODIMENT 18. The method of example embodiment 10, wherein determining the plurality of elemental concentrations is based on the one or more gamma-ray energy spectra and one or more parameters of a set of parameters, wherein the set of parameters comprises: a size of a borehole associated with the borehole environment; whether or not the borehole comprises a casing; a position of a downhole tool within the borehole; a porosity of a geological formation associated with the borehole environment; and a formation density of the geological formation.

EXAMPLE EMBODIMENT 19. A non-transitory, machine-readable media storing instructions that, when executed by processing circuitry, cause the processing circuitry to perform operations comprising: determining a Sigma value associated with a borehole environment based on gamma-ray counts measured at the borehole environment; determining a plurality of elemental concentrations of a corresponding plurality of elements based on one or more gamma-ray energy spectra measured at the borehole environment, wherein the plurality of elements excludes lithium; determining an elemental Sigma contribution of the plurality of elements based on the plurality of elemental concentrations; determining a lithium Sigma contribution based on a difference between the Sigma value and the elemental Sigma contribution; and determining a lithium concentration of the borehole environment based on the lithium Sigma contribution.

EXAMPLE EMBODIMENT 20. The non-transitory, machine-readable media of example embodiment 19, wherein the plurality of elements excludes boron, and wherein determining the lithium Sigma contribution comprises subtracting the elemental Sigma contribution and a boron Sigma contribution from the Sigma value.

EXAMPLE EMBODIMENT 21. The non-transitory, machine-readable media of example embodiment 20, wherein obtaining the boron Sigma contribution comprises determining the boron Sigma contribution based on an estimated boron concentration of the borehole environment.

EXAMPLE EMBODIMENT 22. The non-transitory, machine-readable media of example embodiment 21, wherein the estimated boron concentration is not based on a neutron-induced gamma-ray measurement.

EXAMPLE EMBODIMENT 23. The non-transitory, machine-readable media of example embodiment 19, wherein the Sigma value is determined based on a decay rate of capture gamma rays of the neutron-induced gamma-ray emissions.

EXAMPLE EMBODIMENT 24. The non-transitory, machine-readable media of example embodiment 19, wherein the elemental Sigma contribution comprises a summation of individual contributions to the Sigma value by the plurality of elements.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A system comprising:
one or more downhole tools, wherein a first downhole tool of the one or more downhole tools comprises:
a pulsed neutron generator configured to emit neutrons into a borehole of a geological formation;
one or more first gamma-ray detectors configured to obtain a first measurement of gamma-ray emissions of a borehole environment, the gamma-ray emissions induced by the neutrons emitted from the pulsed neutron generator; and data processing circuitry configured to:
determine a Sigma value associated with the borehole environment based on the first measurement;
determine a plurality of elemental concentrations of a corresponding plurality of elements based on one or more gamma-ray energy spectra obtained via the one or more downhole tools, wherein the plurality of elements excludes lithium;
determine an elemental Sigma contribution of the plurality of elements based on the plurality of elemental concentrations of the corresponding plurality of elements;
determine a lithium Sigma contribution based on a difference between the Sigma value and the elemental Sigma contribution of the plurality of elements; and
determine a lithium concentration within the borehole environment based on the lithium Sigma contribution.

2. The system of claim 1, wherein the plurality of elements excludes boron, and wherein determining the lithium Sigma contribution comprises subtracting the elemental Sigma contribution and a boron Sigma contribution from the Sigma value, wherein the boron Sigma contribution is based on an estimated boron concentration within the borehole environment.

3. The system of claim 2, wherein the estimated boron concentration is based on a second measurement of a second downhole tool of the one or more downhole tools.

4. The system of claim 3, wherein the second measurement comprises a borehole fluid analysis of the second downhole tool.

5. The system of claim 2, wherein the estimated boron concentration is based on a second measurement of gamma-ray emissions of the borehole environment.

6. The system of claim 5, wherein the second measurement of gamma-ray emissions of the borehole environment is performed via the one or more first gamma-ray detectors of the first downhole tool.

7. The system of claim 5, wherein a second downhole tool of the one or more downhole tools comprises one or more second gamma-ray detectors, and wherein the second measurement of gamma-ray emissions of the borehole environment is performed via the one or more second gamma-ray detectors of the second downhole tool.

8. The system of claim 1, wherein the borehole environment comprises a portion of the geological formation surrounding the borehole, and wherein the Sigma value comprises a formation Sigma value or a borehole Sigma value.

9. The system of claim 1, wherein the Sigma value is determined based on a decay rate of capture gamma-rays of the gamma-ray emissions of the first measurement.

10. The system of claim 1, wherein the one or more gamma-ray energy spectra is obtained via the one or more first gamma-ray detectors.

11. A method comprising:
determining a Sigma value associated with a borehole environment based on a first measurement of the borehole environment, the first measurement comprising counts of neutron-induced gamma-ray emissions;
determining a plurality of elemental concentrations of a corresponding plurality of elements based on one or more gamma-ray energy spectra of a second measurement of the borehole environment, the second measurement comprising energy levels of neutron-induced gamma-ray emissions, wherein the plurality of elements excludes lithium;
determining an elemental Sigma contribution of the plurality of elements based on the plurality of elemental concentrations of the corresponding plurality of elements;
determining a lithium Sigma contribution based on a difference between the Sigma value and the elemental Sigma contribution of the plurality of elements; and
determining a lithium concentration within the borehole environment based on the lithium Sigma contribution.

12. The method of claim 11, further comprising:
obtaining the first measurement and the second measurement via one or more gamma-ray detectors of a first downhole tool; or
obtaining the first measurement via the one or more gamma-ray detectors of the first downhole tool and obtaining the second measurement via one or more gamma-ray detectors of a second downhole tool.

13. The method of claim 11, further comprising:
determining the Sigma value and the plurality of elemental concentrations for multiple vertical depths of the borehole environment based on respective measurements obtained at the multiple vertical depths;
determining the lithium concentration associated with each of the multiple vertical depths; and
determining a depth map comprising the lithium concentration associated with each of the multiple vertical depths.

14. The method of claim 11, further comprising obtaining a boron Sigma contribution, and wherein determining the lithium Sigma contribution comprises subtracting the elemental Sigma contribution of the plurality of elements and the boron Sigma contribution from the Sigma value, and wherein the plurality of elements excludes boron.

15. The method of claim 14, wherein obtaining the boron Sigma contribution comprises determining the boron Sigma contribution based on an estimated boron concentration of the borehole environment.

16. The method of claim 11, wherein the elemental Sigma contribution of the plurality of elements comprises a summation of individual contributions to the Sigma value by the plurality of elements.

17. The method of claim 11, further comprising determining whether to perform an extraction of lithium from the borehole environment based on the lithium concentration.

18. The method of claim 17, wherein determining whether to perform the extraction of lithium from the borehole environment comprises:
determining a threshold concentration corresponding to a profitability of the extraction of lithium from the borehole environment; and
comparing the lithium concentration to the threshold concentration.

19. The method of claim 11, wherein determining the plurality of elemental concentrations of the corresponding plurality of elements is based on the one or more gamma-ray energy spectra and one or more parameters of a set of parameters, wherein the set of parameters comprises:
a size of a borehole associated with the borehole environment;
whether or not the borehole comprises a casing;
a position of a downhole tool within the borehole;
a porosity of a geological formation associated with the borehole environment; and
a formation density of the geological formation.

20. A non-transitory, machine-readable media storing instructions that, when executed by processing circuitry, cause the processing circuitry to perform operations comprising:
determining a Sigma value associated with a borehole environment based on gamma-ray counts measured at the borehole environment;
determining a plurality of elemental concentrations of a corresponding plurality of elements based on one or more gamma-ray energy spectra measured at the borehole environment, wherein the plurality of elements excludes lithium;
determining an elemental Sigma contribution of the plurality of elements based on the plurality of elemental concentrations of the corresponding plurality of elements;
determining a lithium Sigma contribution based on a difference between the Sigma value and the elemental Sigma contribution of the plurality of elements; and
determining a lithium concentration of the borehole environment based on the lithium Sigma contribution.

21. The non-transitory, machine-readable media of claim 20, further comprising obtaining a boron Sigma contribution, wherein determining the lithium Sigma contribution comprises subtracting the elemental Sigma contribution of the plurality of elements and the boron Sigma contribution from the Sigma value, and wherein the plurality of elements excludes boron.

* * * * *